United States Patent

[11] 3,556,422

[72] Inventor Routhford J. Burkett
       Indio, Calif.
[21] Appl. No. 699,655
[22] Filed Jan. 22, 1968
[45] Patented Jan. 19, 1971
[73] Assignee Coachella Valley Organic Fertilizer Co.
       a corporation of California

[54] TREE HOGGER UNIT
     9 Claims, 11 Drawing Figs.
[52] U.S. Cl. .................................................. 241/101,
                                                              56/503
[51] Int. Cl. ............................................... B02c 19/12,
                                                              B02c 23/02
[50] Field of Search.......................................... 241/(Mob
         Crusher Digest), 101, 157—9, 231(Cursory),
         232(Cursory), 286, 289, 281, 301; 56/16, 17, 503,
              119; 144/246, 249, 250, 162, 172, 3—4

[56] References Cited
UNITED STATES PATENTS

| | | | |
|---|---|---|---|
| 2,648,943 | 8/1953 | Shafer | 56/17 |
| 2,657,513 | 11/1953 | Martin | 56/16 |
| 2,723,521 | 11/1955 | Karlsson | 56/119 |
| 2,821,220 | 1/1958 | Nicholson | 144/246X |
| 3,099,406 | 7/1963 | Kautz | 241/231X |
| 3,190,326 | 6/1965 | Standal | 144/162 |
| 3,449,780 | 6/1969 | Juno | 241/101X |
| 1,241,325 | 9/1917 | Angus | 56/16 |

*Primary Examiner*—Donald G. Kelly
*Attorney*—Warren, Rubin, Brucker and Chickering ABSTRACT: A mobile tree hogger unit having a masticator assembly with a pair of feed drum units which cooperate to feed tree parts to the masticator for reduction to mulch size chips. The feed drum units are on frames which are adjustably hinged to the hogger unit chassis in such manner as to enable the drum units to be both angularly and elevationally positioned relative to the chassis.

INVENTOR.
Routhford J. Burkett

BY Warren, Rubin, Brucker & Chickering
Attorneys

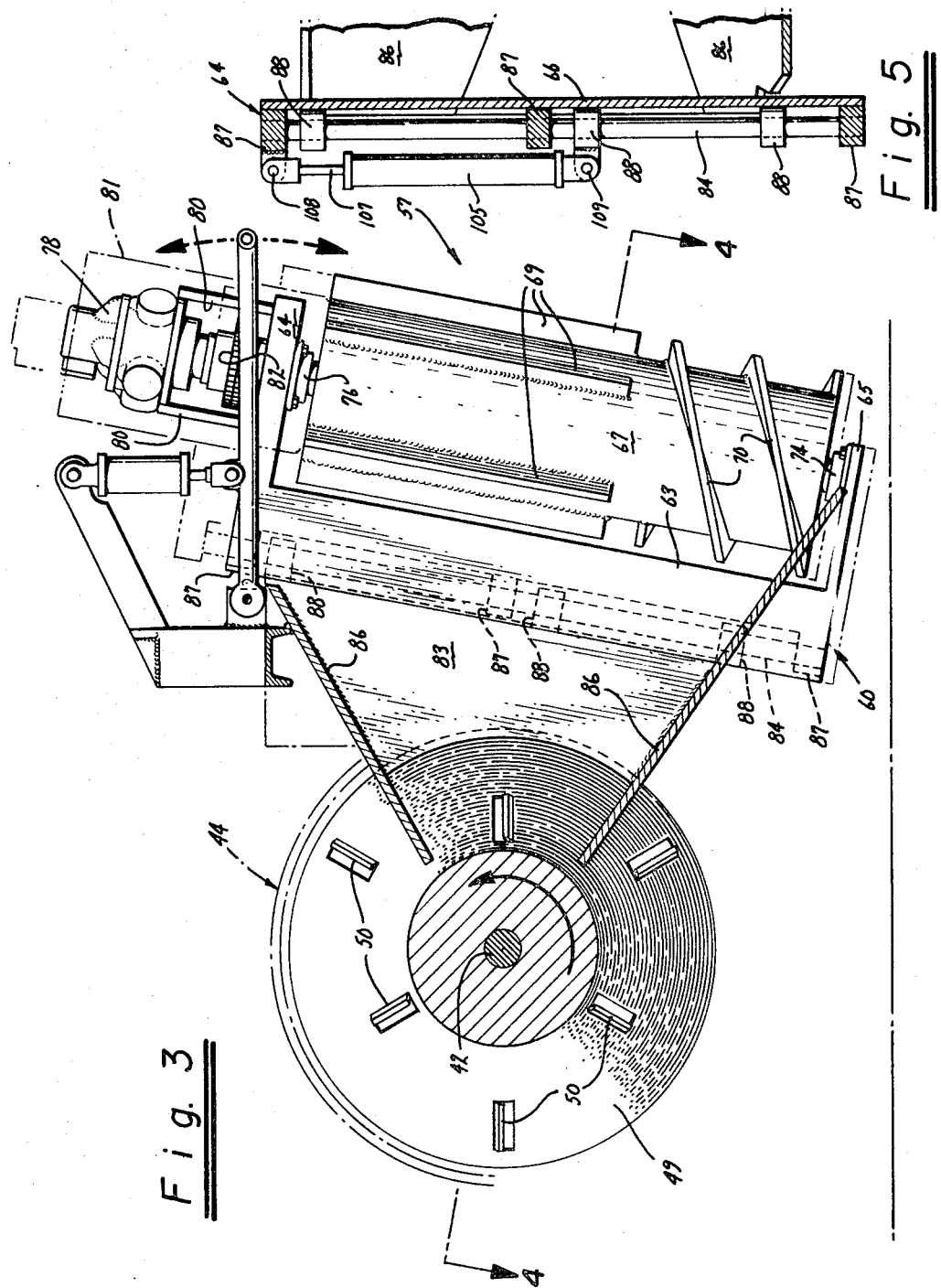

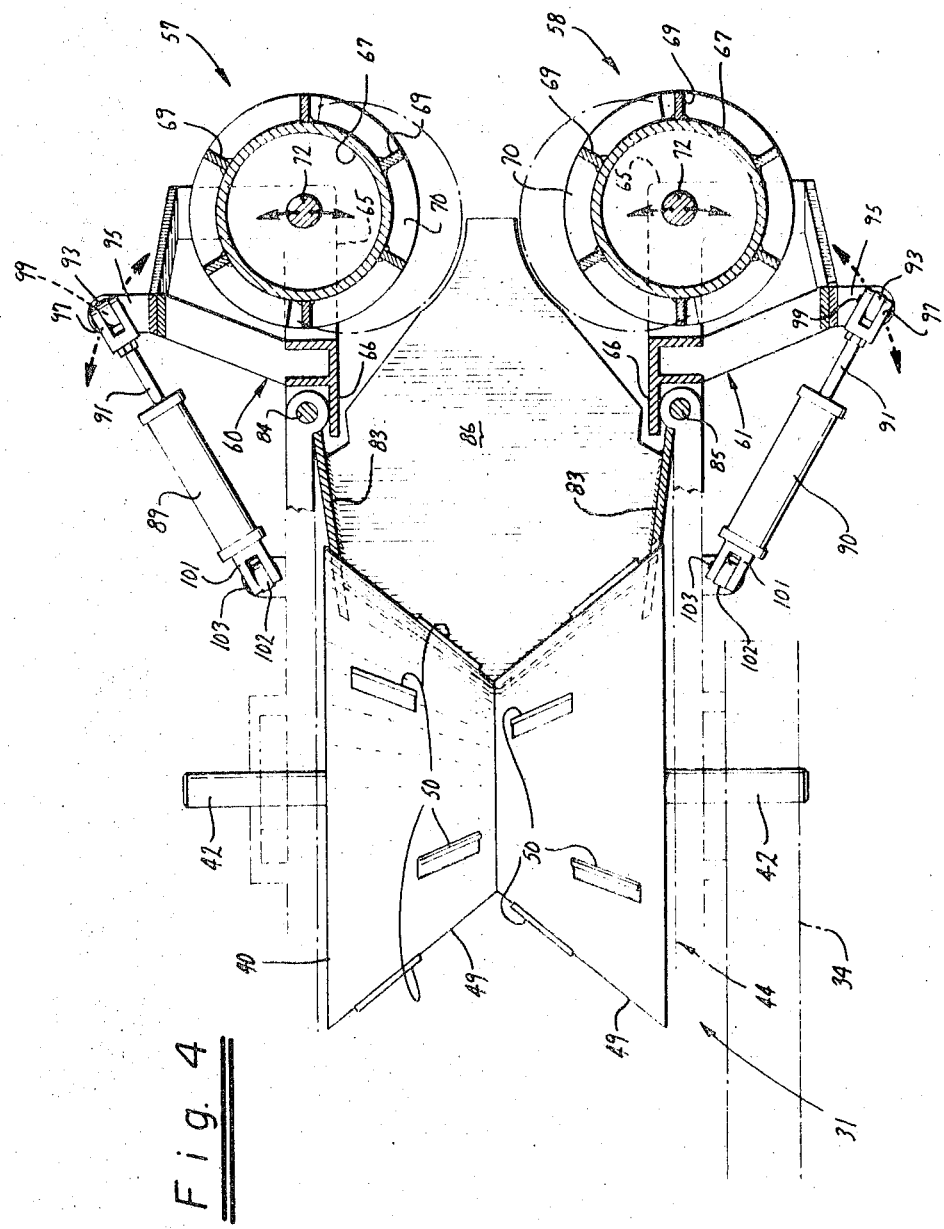

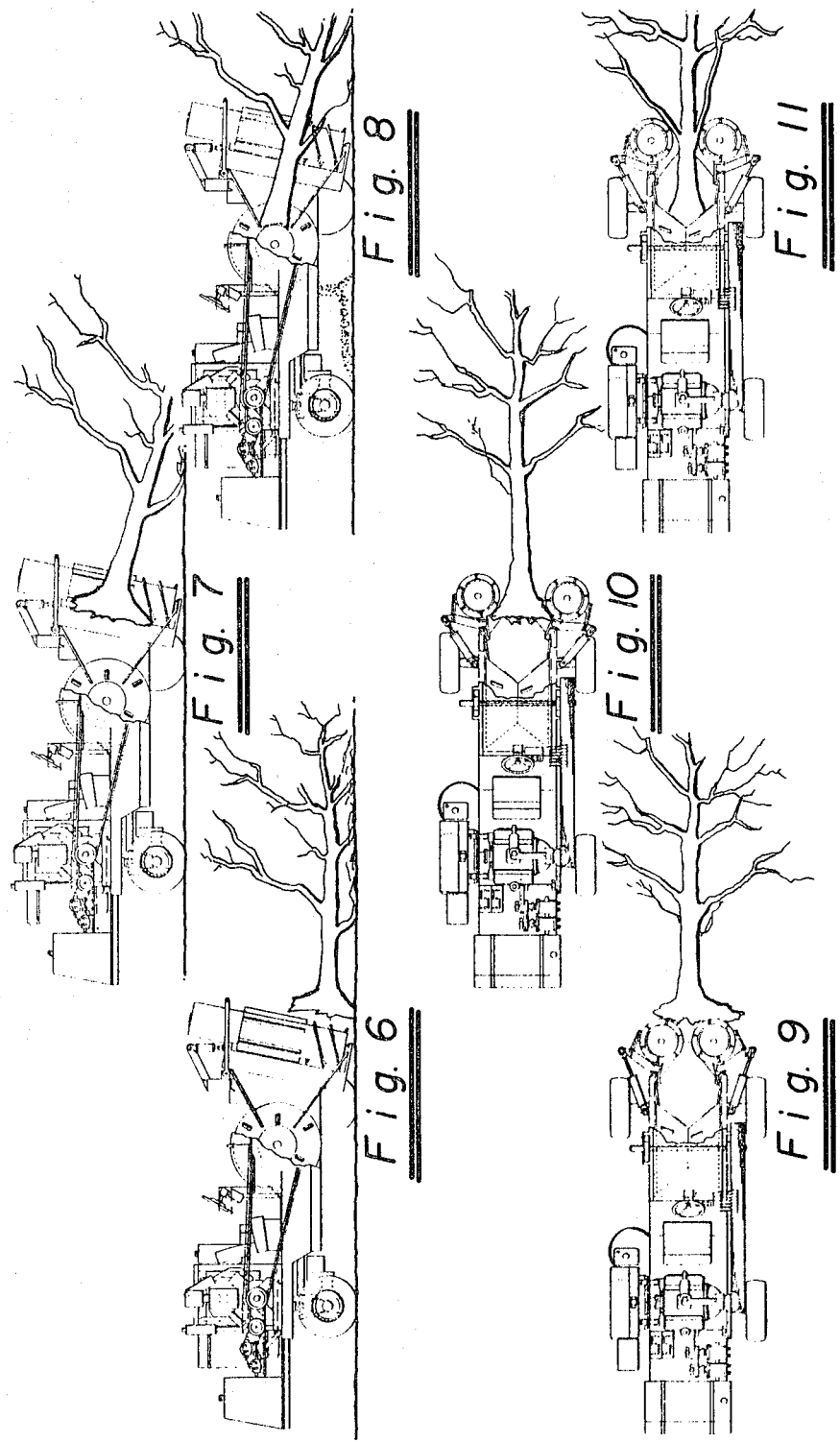

3,556,422

TREE HOGGER UNIT

The invention, for which the following represents a detailed disclosure, relates to a tree hogger unit for reducing tree parts, including the root ball and trunk, to mulch-size chips, and more particularly to such a device which is mobile, and thus capable of masticating entire trees at the place where the trees are actually felled.

Tree removal carries with it the problem of disposing the tree once removed. It is common practice to saw the tops of trees to be removed away from the trunk and then saw the trunk itself into pieces which are more readily capable of being handled by conventional means. The foliage which comprises the top of the tree is then reduced, in some convenient manner, for handling, and then transported from the site. While the trunk of the tree may be used as fire wood, or similar purposes, the foliage is usually burned or dumped in some out-of-the-way place. Where the wood from the trunk of the tree is not needed, it likewise must be disposed of, and the men and machinery required for this purpose is considerable.

Recent experiments in citrus groves demonstrate the advantage of periodic pruning of the grove by removing certain of the fruit trees. It has been found that, where the trees are initially planted with approximately to 100 to 200 trees to the acre, that as the trees mature their fruit bearing capability may be increased substantially by the strategic removal of certain of the trees in the original planting. Specifically, it has been found that removal of every other tree in a row actually doubled the production of a grove with only one-half the number of trees. As the trees in a grove mature they tend to crowd one another. It has been found that the skirt of the tree, i.e. the peripheral area of overhanging branches, is the most productive portion of the tree. Thus, overcrowding tends to reduce fruit bearing capability. Removal of certain of the trees in a grove relieves this overcrowded condition and permits the trees to reach their optimum fruit bearing capability and increased productivity is achieved.

Because of the initial closeness of the trees in an orchard, it is both expensive and difficult to remove large numbers of trees therefrom, and this is especially so of trees deep within the grove.

If, for example, the trees, upon being felled, were dragged from the grove, the branches comprising the skirts of the remaining stand would be damaged. Thus, prior to the present invention, it was necessary to cut up the trees in the grove and drag them out piece by piece. It is an object of the present invention in view of the foregoing to provide a compact mobile tree hogger which is capable of going into a grove of trees and reducing felled tree parts at the site without damage to surrounding trees.

Devices are known which are designed to masticate small limbs and branches disposed in windows. Exemplary of such devices is the construction shown in Atmore U.S. Pat. No. 2,925,703. The Atmore disclosure is unequivocably directed to a construction which is intended solely to masticate loose brush disposed in windows.

Moreover, no increase in horsepower could render Atmore capable of masticating tree trunks or root balls. Accordingly, it is another object of the invention to provide a tree hogger which is selectively operable to engage tree parts irrespective of substantial size variations and continuously and positively feed all such parts to a masticator assembly which comprises a portion of the hogger unit.

Still another object of the present invention is the provision of an improved apparatus for pruning groves of trees and otherwise effecting tree removal and on site reduction to form a useful byproduct.

It is a further object of the present invention to provide a tree hogger of the type herein described, which is mobile, and therefore, capable of functioning at the sight where the tree is actually felled. An object related to the foregoing is the provision of a hogger device which is readily controlled by one man and maneuverable with a dexterity which permits its convenient use in citrus orchards where maneuvering space is limited.

Another, and still further object of the present invention, is to provide a tree hogger which is highly efficient and is so constructed as to be extremely durable, and effective to reduce entire trees to usable mulch in a single operation once the tree has been felled.

Trees, even of the same variety, may vary in size and to some extent in hardness, and it is an additional object of the present invention to provide apparatus which is capable of adjusting to various positions of the felled tree to assure proper mulching and is further constructed to avoid breakdowns due to overloading as a consequence of the size or hardness of the wood being masticated.

These and other objects and advantages of the present invention will appear from the following detailed description, when read in conjunction with the drawings, wherein:

FIG. 3 is an enlarged fragmented, and partially sectioned view of the feed and control assembly for the masticator;

FIG. 4 is a section of FIG. 3 taken along lines 4—4 of FIG. 3;

FIG. 5 is an enlarged and sectioned view of the frame hinge and elevating mechanism;

Figure 1:
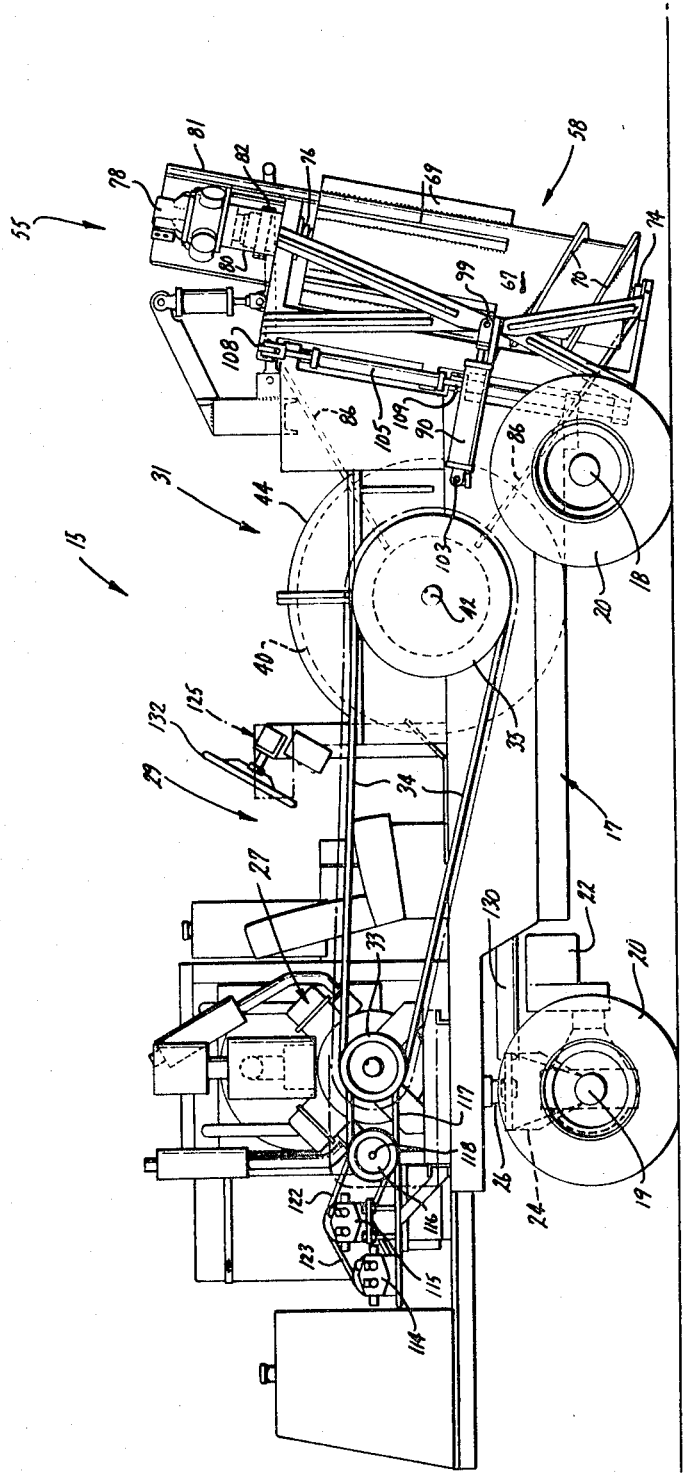
FIG. 1 is a side elevation of a tree hogger unit construction in accordance with the present invention.

FIGS. 6, 7, and 8 comprise a series of views illustrating the action of the hogger unit of FIG. 1 as it approaches and masticates a tree; and FIGS. 9, 10 and 11 are top plan views of FIGS. 6, 7 and 8 respectively, partially fragmented to illustrate the action of the moving parts of the apparatus.

While the invention is susceptible of various modifications and alternative constructions, a particular illustrative embodiment is set out in the drawings and will be described in detail hereinafter. It will be understood that the invention is not intended to be limited to the particular disclosed form, but rather to cover all modifications, alternative constructions, and equivalents falling within the spirit and scope of the invention as expressed in the appended claims.

With reference now to the drawings, a mobile tree hogger unit is illustrated in detail, and comprises a chassis disposed on front and rear wheeled axles, the rear one of which is steerable and powered to transport the chassis. An internal combustion engine is mounted on the chassis and drives a masticator unit, also mounted on the chassis, which reduce trees and the like to small chips. A feed and control assembly is provided for urging trees into the masticator. The feed and control assemblies are adjustable to position the same to permit optimum positive control of the tree as it is being fed to the masticator.

With particular reference to FIG. 1, a tree hogger constructed in accordance with the present invention is indicated generally at 15 and comprises a chassis 17 disposed upon front and rear axles 18 and 19, respectively, and both axles are supported by wheels 20 at the ends thereof. The forward axle 18 is solid, and secured to the chassis 17 by means of any suitable suspension system (not specifically illustrated). The rear axle 19 is live, being drivable by means of a fluid motor 22. In order to render the chassis steerable, the rear axle 19 is supported on either side of the differential housing by axle connecting means comprising a yoke 24, which connects to a single, centrally disposed pillar 26 so as to be rotatable about the pillar. An internal combustion engine 27, which may be of either a diesel or spark ignition type, is mounted on the chassis, in this instance, above the rear wheels, and is controlled from the operator's position, indicated generally at 29.

Figure 2:
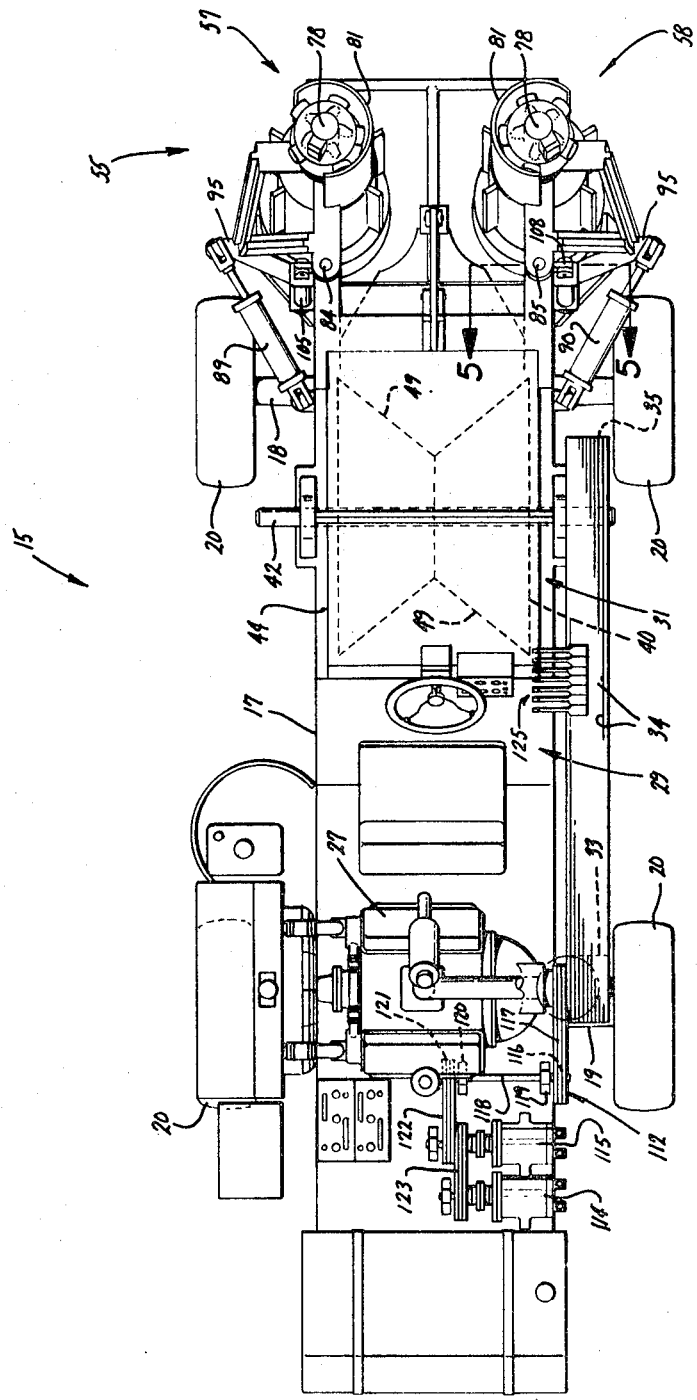
FIG. 2 is a top plan view of the unit of FIG. 1.

The engine serves the dual function of driving a large masticator assembly, indicated generally at 31, and the fluid pressure pumps which provide the motive power for the unit. The masticator is driven, in this particular instance, from a main pulley 33, connected to the engine crankshaft, which drives belts 34 connected to the masticator pulley 35. In order to minimize slippage, a series of V belts may be employed, as best seen in FIG. 2.

The masticator assembly 31 is of a known construction, and comprises a masticator drum indicated generally at 40 (see FIG. 2) disposed on a shaft 42 for rotation in a housing 44. The shaft 42 is journaled in a sidewall 46 and 47 of the housing, and the pulley 35 is keyed or otherwise attached to the shaft for rotating the same.

The drum itself comprises a pair of truncated conic sections 49 mounted on the shaft so as to converge at the center thereof, and teeth 50 are formed about the periphery of the sections 49 having sharpened edges which are aligned so as to cut as the drum is rotated, in this instance, counterclockwise as seen in FIG. 1. The masticator is constructed of heavy material and is balanced, and acts like a flywheel so as to be rotatable at relatively high speeds thereby developing substantial momentum. Accordingly, the masticator is sufficiently powerful to reduce tree trunks to mulch-size chips.

In contrast to brush disposed in windrows, entire trees are comparatively heavy, and present unique handling problems due to substantial size variations from root ball to trunk. It is necessary, therefore, to maintain continuous and positive control of the tree parts in order that they may be fed to the masticator. This is accomplished in keeping with the invention by means of a novel feed and control assembly 55 disposed at the forward end of the chassis immediately in front of the masticator. Controlled feeding of a tree to the masticator is accomplished by the assembly 55 by engaging the tree with a pair of feed drum units indicated generally at 57 and 58. The drum units 57 and 58 are supported for rotation on feed drums support frames 60 and 61 respectively, attached to the chassis. The frames are, in the structure illustrated, formed of heavy steel plate, and as may be seen in FIG. 3, comprise a yoke having a main support member 63 and transverse upper and lower supporting members 64 and 65, respectively. The main member includes a flat plate 66 which acts as a guide to the throat of the masticator.

The drums, as may be seen in FIG. 4, comprise cylinders 67 having a series of axially extending radially disposed blades 69, and as seen in FIG. 3 a peripherally disposed continuous helical blade 70 which extends over about one-third of the height of the drum, beginning at the bottom. The cylinders 67, are mounted on driveshafts 72, and in order to permit free rotation thereof under loading during feeding of the heavy tree parts, the drive shafts are journaled both at the bottom, in a bearing 74, and at the upper end in a bearing disposed in the transverse member 64, the cap for which is seen at 76.

The blades of the drum are adapted to positively engage the tree by penetrating at least the bark, lift the same to a position in alignment with the masticator throat, and feed the same toward the masticator. In order to provide the controlled force necessary to this function, the drums are preferably driven by fluid motors 78 which are secured with respect to transverse member 64, by pal plates 80. The motors are protected against damage from limbs by shrouds 81, which also assist in deflecting limbs toward the masticator.

Because of the heavy, and uneven loading to which the drums are subjected by virtue of the variation in size and density of various parts of the tree being masticated, and in order to compensate for limited drum shaft deflection, the upper ends of the shafts 72 are connected with their respective drive motors by means of a flexible coupling assembly 82. Various types of flexible drive couplings are known. The illustrated assembly comprises a pair of identical gears disposed in opposed face-to-face relation with one gear being on the fluid motor shaft, and the other being connected with the top of the shaft 72. A continuous chain is then disposed about the gears with the links engaging the teeth thereof. This arrangement provides power transmission, while permitting some misalignment of the shaft. It also may serve as overload protection in that the chain may be designed with pins having a predetermined shear strength which, when exceeded, will cause severance of the chain and thus the drive between the motor and drum. In this manner, the drum and the fluid motor are protected against overload which might occur when the power necessary to draw the tree into the masticator exceeds the strength of any of the vital feeding elements.

The use o of fluid motors, such as indicated at 78, provides the additional desirable feature of permitting independent control of each of the drums. Accordingly, should one drum become loaded more that the other, individual control of these mt motors permits necessary application of fluid under pressure to compensate for the uneven loading. Moreover, since the drums 57 and 58 are rotated oppositely, the former being rotated clockwise as seen in FIG. 4, and the latter being rotated in a counterclockwise direction, this is readily accomplished by the use of individual motors, and eliminates the need of a differential gear arrangement which might otherwise be required.

The use of individual drive motors for the drums provides still another advantage in that the tree parts may be fed to the throat of the masticator smoothly despite discontinuities in the tree structure. Since a tree is seldom absolutely symmetrical one drum may be required to roll farther than the other during part of the feeding process. In order to maintain proper tree-to-masticator alignment, one drum may be required to go faster than the other at certain times. With individually controlled fluid motors, it is possible for the affected drum to speed up or slow down individually, to maintain the tree on its proper course through the drums. Once past the drums, a stationary plate assembly 82 which includes deflector plates 83 and 86, which converge toward the throat of the masticator, guide the tree smoothly.

In practice, the tree to be fed to the machine has previously been uprooted, such as by a bulldozer and is disposed on its side, when the it is allowed to dry for approximately 5 days. Consequently, a root ball of substantial diameter is initially presented to the hogger and that is followed by the trunk of the tree which is of considerable less diameter. The apparatus of the present invention in is constructed to be selectively controlled to accommodate changes in diameter, by varying the opening between the drums, and thereby permit positive and uninterrupted control of the tree parts throughout the chipping process. With reference now to FIG. 4, it will be seen that frame 60 and 61 are pivotable so as to adjust the relative position of the drums and permit continuous contact with the tree irrespective of its diameter at any position along its length measured between the drums themselves.

In accordance with this feature of the invention, frame members 60 and 61 are pivotally mounted about elongated hinge pins 84 and 85 respectively. The pins 84 and 85 interconnect the chassis and frame members by passing through intermeshing cylindrical bosses 87 on the frame, and 88 on the chassis. It will be seen in FIG. 3 that the hinge pin 84 and 85 are parallel with the shafts 72 of the drums, thereby maintaining the predetermined angle of the drum with respect to the ground which, as may be seen in FIG. 3, is approximately 75°.

As previously explained, it is necessary to efficient operation to maintain positive engagement of the drums with the tree at all times as it progresses toward the masticator. Since the drums are freely pivotable about the hinge pin 84, they may be positively urged into engagement with the tree as it passes between them. This is accomplished by means of fluid motors 89 and 90.

The motors, as may be seen in FIG. 4, comprise hydraulic cylinders having reciprocable rams 91 extending from the cylinder body, and engaging in eyelet 93 rigidly secured to and outwardly extending boss 95 on the drum mounting frames. A clevis 97 affixed to the end of the ram 91 engages the eyelet by means of a pin 99 to complete the connection. The cylinder is grounded to the chassis by means of a clevis 101 which surrounds an eyelet 102 and is secured thereto by means of the clevis pin 103. Thus, predetermined directional application of fluid to the motor 89 results in extension or retraction of the ram, causing the drum frame to be pivoted about the pin 84. In this way the operator may spread the frames to initially open the device to receive the root ball, and then move the frames together so that the drums positively engage the tree. Moreover, as the cross-sectional dimension of the tree varies, the operator may adjust the drum frame positions accordingly so that continuous positive engagement with the tree is constantly maintained.

The drum and frame assemblies are heavy, and the drums themselves supported top and bottom in bearing capable of handling the loads to which the drums are subjected. Moreover, the frames are constructed with a number of degrees of freedom of movement, and such movement would be impaired if the frames were on the ground. Accordingly, the drums are not constructed to engage the ground or pick up material directly therefrom.

A tree disposed on its side after being uprooted not only differs in diameter as measured along the line between the shafts 72, but also may vary in its height relative to the ground upon which it has been felled. In order to render the feed assembly 55 capable of picking up the parts and feeding them to the masticator, the position of the drums, are in accordance with the invention also rendered vertically adjustable with respect to the ground. This limited adjustability of the relative height of the drums thus permits the operator to make effective use of the blade geometry of the drums irrespective of the height of the tree from the ground. Indeed, having once engaged a part thereof with the drums, the operator can lift that part to an extent prior to rearward feeding thereof.

With reference now to FIGS. 1, 3, and 5, it will be seen that the knuckles or cylindrical bosses 87 on the chassis and drum supporting frames respectively are spaced from one another, and contrary to typical door hinge arrangements do not ride against one another. This spacing provides a sliding hinge connection which permits limited height adjustment of the support frames and thus the drums themselves. Height adjustment for each drum is accomplished by means of a fluid motor 105 having a ram 107 extending therefrom, and pivotally attached by means of a clevis and eyelet arrangement 108 to the top transverse member 64 of the supporting frames. The cylinder of the fluid motor 105 is pivotally mounted at 109 to the chassis, and it will be appreciated that extension or retraction of the ram 107 will cause limited elevation or lowering of the drums to permit their proper positioning with respect to each portion of the tree as it is fed to the device.

It is an additional attribute of the tree hogger, which comprises the present invention, that it is operable from the control position 29 by one man. As seen in FIG. 2, the internal combustion engine is connected, through a power takeoff 112 to hydraulic pumps 114 and 115. In the instance shown, the power takeoff includes a main driven pulley 116 connected to the drive shaft by belts 117, and is connected to a shaft 118 journaled in pillow blocks 119 and 120, respectively. A transfer pulley 121 on the opposite end of the shaft drives the pump 115 by belts 122, and a second pulley on the shaft for pump 115 drives pump 114 by means of belts 123. The pumps 114 and 115 provide the fluid pressure not only to drive the motor 22 and drum drive motors, but also the previously described fluid motors which control the positioning of the drums 57 and 58. All of these functions are performed by means of a series of control levers 125 at the convenient disposal of the operator.

With the masticator and feed assembly 55, disposed forwardly, the rear wheel drive and steering which forms a part of the chassis permits ready alignment of the chassis with the longitudinal axis of the felled trees to be fed to the device. Steering by means of the axle 19 is accomplished by a fluid motor 130 which is connected between the yoke 24 and the chassis frame. The employment of any well-known valve arrangement connected to the steering wheel 132 controls both the direction and pressure to be applied to the fluid motor 130 thereby permitting a natural "feel" of the road through the steering wheel 132. Moreover, the use of fluids, such as hydraulic oil, permits not only individual control of the various operative functions of the device from a single, essentially constant speed prime power source, such as the internal combustion engine 27, but effectively prevents damage due to overload, a feature which would not be as effective through the use of more conventional gear drives and like transmission elements. Thus, the use of hydraulics permits a degree of flexibility in compensating for the irregularity commonly encountered in operations of the type for which the device has been constructed.

With reference to FIGS. 6 and 11, the hogger unit is there shown in a series of views illustrating its approach to, and consumption of, an exemplary tree. Particularly in FIGS. 9, 10 and 11, it is possible to see the relative movement of the drums toward and away from each other as the drums are continuously urged into contact with the tree itself.

In FIGS. 6, 7 and 8 the machine is advanced as the tree is consumed. While the device is sufficiently powerful enough to draw an entire tree into it while stationary, the chips expelled beneath the masticator would be more useful if spread out. Thus, by simultaneously moving the vehicle forwardly at a predetermined rate, the chips are spread out and do not simply accumulate in a large pile beneath the masticator. They may then be sprayed with a bacteria which accelerates their decomposition, and finally distributed where needed.

It will be understood that the hogger unit of the present invention is capable of reducing hardwood trees having trunk diameters in excess of 16 inches with preliminary pruning or cutting. The entire tree is consumed intact upon being allowed to dry for a period after uprooting.

I claim:

1. In a tree hogger characterized by a chassis having a masticator assembly supported thereon the combination comprising;
   a pair of support frame means hingedly secured to the chassis adjacent the masticator assembly;
   a pair of feed drum units, one mounted in each of said support frame means and disposed generally parallel to one another for moving tree parts to the masticator assembly; and
   selectively operable power-operated frame-positioning means operatively associated with said frame means for pivotally positioning said frame means relative to said chassis and thereby varying the distance between said drum units mounted in said frame means.

2. The apparatus of claim 1 wherein said drum units each comprise:
   a drum shaft; and
   a feed cylinder secured to said shaft for rotation therewith; and further
   wherein said support framed means each comprise:
      a main support member extending generally parallel to the axis of rotation of said cylinders and hingedly connected to the chassis;
      a pair of transverse support members extending from said main support member at locations spaced apart a distance approximately equal to the length of said shaft; and
      bearing means in said transverse support members in which said drum shaft is mounted.

3. The tree hogger of claim 1 further comprising an hydraulic motor operatively associated with each of said drum units providing rotational drive therefor.

4. The apparatus of claim 1 further comprising:
   sliding hinge connection means connecting said frame means to the chassis; and
   selectively operable, power operated hinge positioning means disposed between said frame means and said chassis whereby the position of said frame means relative to the chassis along said hinge connection means is selectively variable.

5. The tree hogger of claim 1 further comprising:
   a forward-wheeled axle located at and supporting the portion of the chassis which represents the direction of normal forward travel;
   a rear-wheeled axle spaced apart from said forward axle and located at and supporting the rear portion of the chassis, relative to said forward axle;

axle-connecting means pivotally mounting said rear axle for movement about an axis perpendicular to the direction of travel; and power-operated steering means associated with said axle-connecting means for selectively rotating said rear axle about its axis of rotation for controlling the direction of travel of the hogger.

6. In a tree hogger characterized by a chassis and a masticator assembly mounted on the chassis, the combination comprising:

a pair of feed drum support frames secured to the chassis, said frames having a pair of spaced-apart bearing members; and a feed drum mounted on each of said frames between said bearing members;

sliding hinge connection means securing said frames to said chassis wherein said frames are movable relative to the chassis in a direction along said hinge connection; and fluid motors connected between said frames and chassis for selectively positioning said frames along said hinge connections.

7. The tree hogger of claim 6 wherein said sliding hinge connection means comprises:

spaced bosses formed on both said frames and the chassis;

a pin interconnecting said frame bosses and said chassis bosses thereby pivotally mounting said frames with respect to the chassis; and power means interconnecting the chassis and said frames, said power means selectively operable to move said frames relative to the chassis along said pin and thereby vary the positions of said frames relative to the chassis.

8. The apparatus of claim 6 wherein said sliding hinge connections means are further described as having a hinge axis substantially parallel to the axis of said feed drums.

9. The apparatus of claim 3 further comprising; flexible coupling means joining said motors to said drum units whereby said motors are protected against damage due to minor misalignment of said drum units therewith due to forces experienced by said drum units during operation.

UNITED STATES PATENT OFFICE
CERTIFICATE OF CORRECTION

Patent No. 3,556,422      Dated January 19, 1971

Inventor(s) Routhford J. Burkett

It is certified that error appears in the above-identified patent and that said Letters Patent are hereby corrected as shown below:

Column 1, line 23, change "200" to --120--.

Column 3, line 51, after "by", delete --pal--.

Column 4, line 1, after "use", delete --o--.

Column 4, line 5, after "these", delete --mt--.

Column 4, line 31, after "when", delete --the--.

Column 6, line 47, in Claim 2, change "framed" to --frame--.

Signed and sealed this 11th day of May 1971.

(SEAL)
Attest:

EDWARD M. FLETCHER, JR.
Attesting Officer

WILLIAM E. SCHUYLER, JR.
Commissioner of Patents